(12) United States Patent
Henniger et al.

(10) Patent No.: US 7,099,924 B1
(45) Date of Patent: Aug. 29, 2006

(54) REMOTE ADMINISTRATION FUNCTION IN A TELECOMMUNICATION SYSTEM

(75) Inventors: Andreas Henniger, Essen (DE); Frank Schnapka, Dortmund (DE); Jürgen Schwartze, Dortmund (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/272,075

(22) Filed: Mar. 18, 1999

(30) Foreign Application Priority Data

Mar. 18, 1998 (DE) .......................... 198 11 841

(51) Int. Cl.
*G06F 15/16* (2006.01)

(52) U.S. Cl. ................... 709/217; 709/224; 709/379; 709/201

(58) Field of Classification Search ............... 709/217, 709/224; 379/201, 220, 88.18, 112, 88.14, 379/220.01, 201.04, 211; 713/100; 370/466; 455/461
See application file for complete search history.

(56) References Cited

U.S. PATENT DOCUMENTS

| | | | | |
|---|---|---|---|---|
| 5,329,570 A | * | 7/1994 | Glassmacher et al. | 379/189 |
| 5,568,487 A | * | 10/1996 | Sitbon et al. | 370/466 |
| 5,689,550 A | * | 11/1997 | Garson et al. | 379/88.18 |
| 5,740,365 A | | 4/1998 | Pfeiffer et al. | 709/224 |
| 5,870,454 A | * | 2/1999 | Dahlen | 379/88.14 |
| 5,889,845 A | * | 3/1999 | Staples et al. | 379/211 |
| 5,933,778 A | * | 8/1999 | Buhrmann et al. | 455/461 |
| 6,052,456 A | * | 4/2000 | Huang | 379/201.04 |
| 6,185,290 B1 | * | 2/2001 | Shaffer et al. | 379/220 |
| 6,199,160 B1 | * | 3/2001 | Echensperger et al. | 713/100 |
| 6,249,571 B1 | * | 6/2001 | Rojas | 379/112 |
| 6,327,355 B1 | * | 12/2001 | Britt | 379/201.03 |
| 6,587,124 B1 | * | 7/2003 | Slaby | 345/735 |
| 6,601,065 B1 | * | 7/2003 | Nelson et al. | 707/4 |

FOREIGN PATENT DOCUMENTS

| | | |
|---|---|---|
| DE | 44 41 357 A1 | 8/1995 |
| EP | 0 644 483 A1 | 3/1995 |

* cited by examiner

*Primary Examiner*—Larry D. Donaghue
*Assistant Examiner*—Jungwon Chang
(74) *Attorney, Agent, or Firm*—Laurence A. Greenberg; Werner H. Stemer; Ralph E. Locher

(57) ABSTRACT

In a telecommunication system having a remote administration function, a virtual terminal having the properties of a terminal with administration authorization is defined. The data stream to and from the virtual terminal being diverted to a remote computer connected to the telecommunication system.

10 Claims, 5 Drawing Sheets

REMOTE ADMINISTRATION FUNCTION IN A TELECOMMUNICATION SYSTEM

BACKGROUND OF THE INVENTION

Field of the Invention

The invention relates to a remote administration function in a telecommunication system.

In order for it to operate, a telecommunication system needs an internal database containing information on allocations of terminals to internal numbers or addresses, particular functions of terminals, call diversions, telephone number registers, etc. Whenever there are changes to the telecommunication system, for example as a result of the subscribers changing, the system being enlarged, new terminals being connected etc., the database has to be adapted and modified accordingly. In order to be able to adapt the database on a rational basis, it is desirable to have a remote administration function so as to be able to perform the changes via a service center, for example, belonging to the manufacturer or the operator of the telecommunications installation.

There are essentially two known variants for remotely manipulating the database. In the first variant, the entire database of the telecommunications installation is transferred to a PC connected via a network, for example, and the database is changed using an appropriate service tool. The modified database matched to the new events is then returned to the telecommunication system again. A disadvantage of this method are the relatively long transfer times required by the database over the network.

Another, known possibility is to create a comprehensive administration interface in the telecommunication system especially for administration using a terminal, or the like, which is to be connected. The disadvantage of this is the increased space requirement for the telecommunication system.

SUMMARY OF THE INVENTION

It is accordingly an object of the invention to provide a remote administration function in a telecommunication system that overcomes the above-mentioned disadvantages of the prior art devices of this general type, in which rapid manipulation of a database for an operating telecommunication installation is accomplished without increasing the size of the hardware resources.

With the foregoing and other objects in view there is provided, in accordance with the invention, a telecommunication system having a remote administration function, including: a telecommunications apparatus defining a virtual terminal with properties of a terminal with administration authorization; and a remote computer connected to the telecommunications apparatus, and a data stream to and from the virtual terminal is diverted to the remote computer.

According to the invention, in a telecommunication system having a remote administration function, a virtual terminal having the properties of a terminal or subscriber with administration authorization is defined, and the data stream to and from the virtual terminal is diverted to a remote computer connected to the telecommunication system. The remote computer is preferably a PC.

The virtual terminal is preferably connected to a virtual port that is defined on a virtual unit, the virtual unit being disposed in a virtual slot. Therefore, advantageously, no additional hardware resources are required.

In order to grant the user the simplest possible access to the telecommunication system, the invention provides for the remote computer to have a message interpreter and an emulator of the interface of the terminal with administration authorization.

The message traffic between the virtual port and the telecommunication system is diverted to a data interface for the system. In this case, the data interfaces used for the telecommunication system may be a V.24 port, an analog modem or a digital integrated service digital network (ISDN) card.

Other features which are considered as characteristic for the invention are set forth in the appended claims.

Although the invention is illustrated and described herein as embodied in a remote administration function in a telecommunication system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
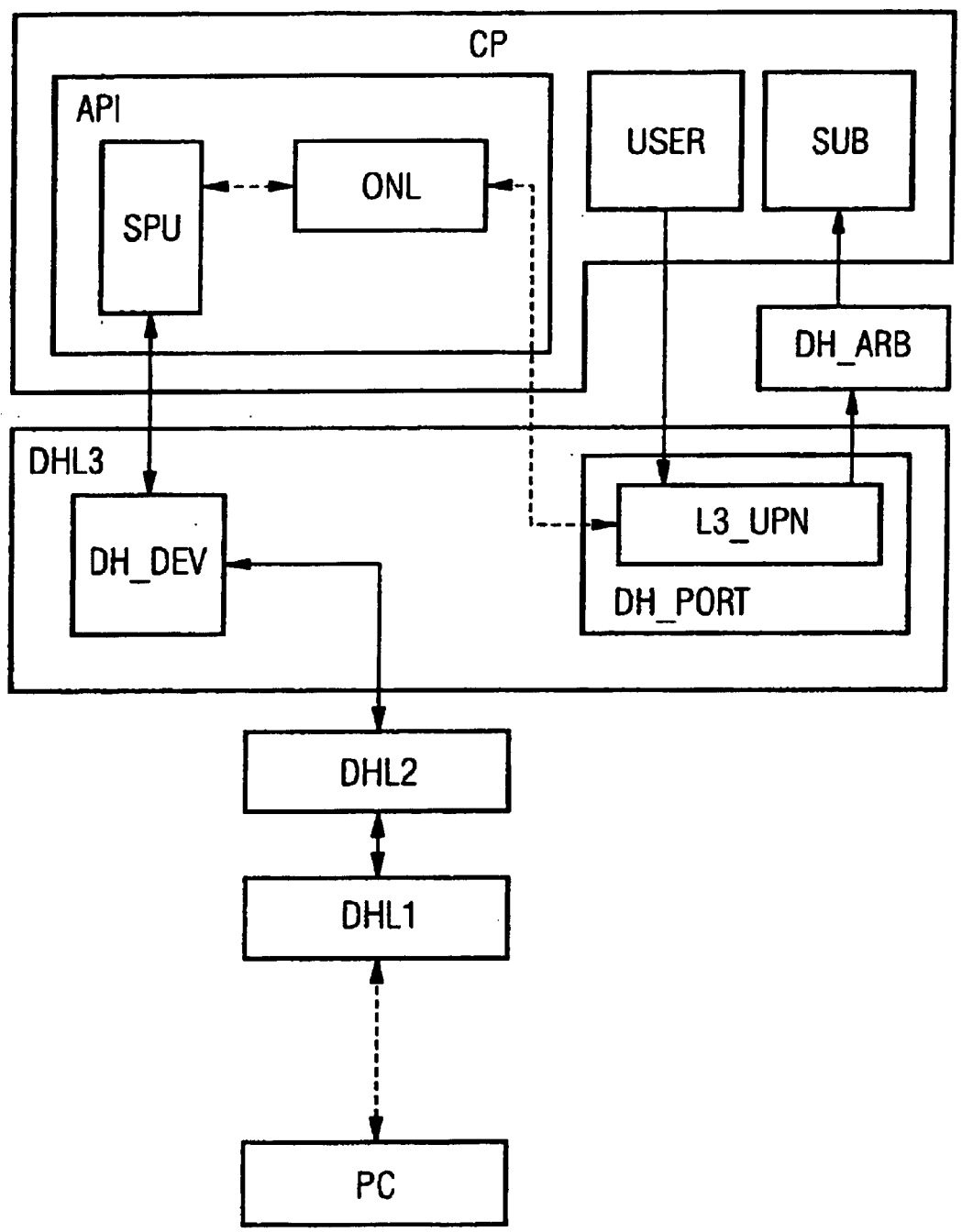
FIG. 1 is a diagrammatic, block diagram of an integration of an "Online" application ONL in a call processing unit for a telecommunication system according to the invention.

In all the figures of the drawing, sub-features and integral parts that correspond to one another bear the same reference symbol in each case. Referring now to the figures of the drawing in detail and first, particularly, to FIG. 1 thereof, there is shown a block diagram showing an integration of an application ONL in a call processing unit CP of a telecommunication system. The application ONL manages the message traffic between a remote computer PC and the telecommunication system or manages the path of signals or messages from or to the remote computer PC by way of the OSI layers in the telecommunication system. A connection, for example an integrated service digital network (ISDN) connection, connects the remote computer PC to the layer-1 device handler DHL1 and to the telecommunication system. The layers mentioned here are understood as being layers in the OSI layer model. The layer-1 device handler DHL1 interchanges data with a layer-2 device handler DHL2, which in turn is connected to a layer-3 device handler DHL3 in a third OSI layer. One component of the layer-3 device handler DHL3 is the module DH_DEV (device handler for the device), which is responsible for managing external connections, such as ISDN and V24. The module DH_DEV communicates with a module SPU (SPU=session and presentation unit) in a fifth OSI layer, the latter module being a component of the module API (API=application interface); the module API is a constituent part of the call processing unit CP in the telecommunication system. The module SPU functions as a distributor, that is to say it evaluates a message received from the module DH_DEV by analyzing the received message to determine which module it should be sent to. If the analysis shows that the message received is addressed to a module ONL (Online), then the corresponding message is passed on to the module ONL. The module ONL communicates with a device handler L3_UPN that in the third OSI layer is a constituent part of the device handler DH_PORT for the ports of the telecommunication system. The module L3_UPN is the device handler for digital menu-operated terminals, whereas the device handler DH_PORT produces, for the ports in general, the physical addresses of the connections in the telecommunication terminals.

By way of example, some telecommunication systems are provided with 500 ports, i.e. connections for telephones or the like. In order to achieve error-free communication with the remote computer PC from the physical ports which are actually present, the number of ports is increased by 1; hence, for example, in an installation with 500 ports, there is an increase of 1 to the port number 501. In the device handler DH_PORT, therefore, the module L3_UPN also includes the additional port, having the number 501, which is the virtual port in the example.

The interface L3_UPN receives messages from the module USER in the call processing unit CP, the module USER being responsible for handling menus which are to be shown on the terminal. In addition, the interface L3_UPN sends data from the remote computer PC via a buffer DH_ARB to the module SUB (SUB=subscriber) in the call processing unit CP, the function of which module SUB is to process a message or data from a UPN terminal, in the example from the remote computer PC connected to virtual port number 501, in an appropriate manner.

Figure 2:
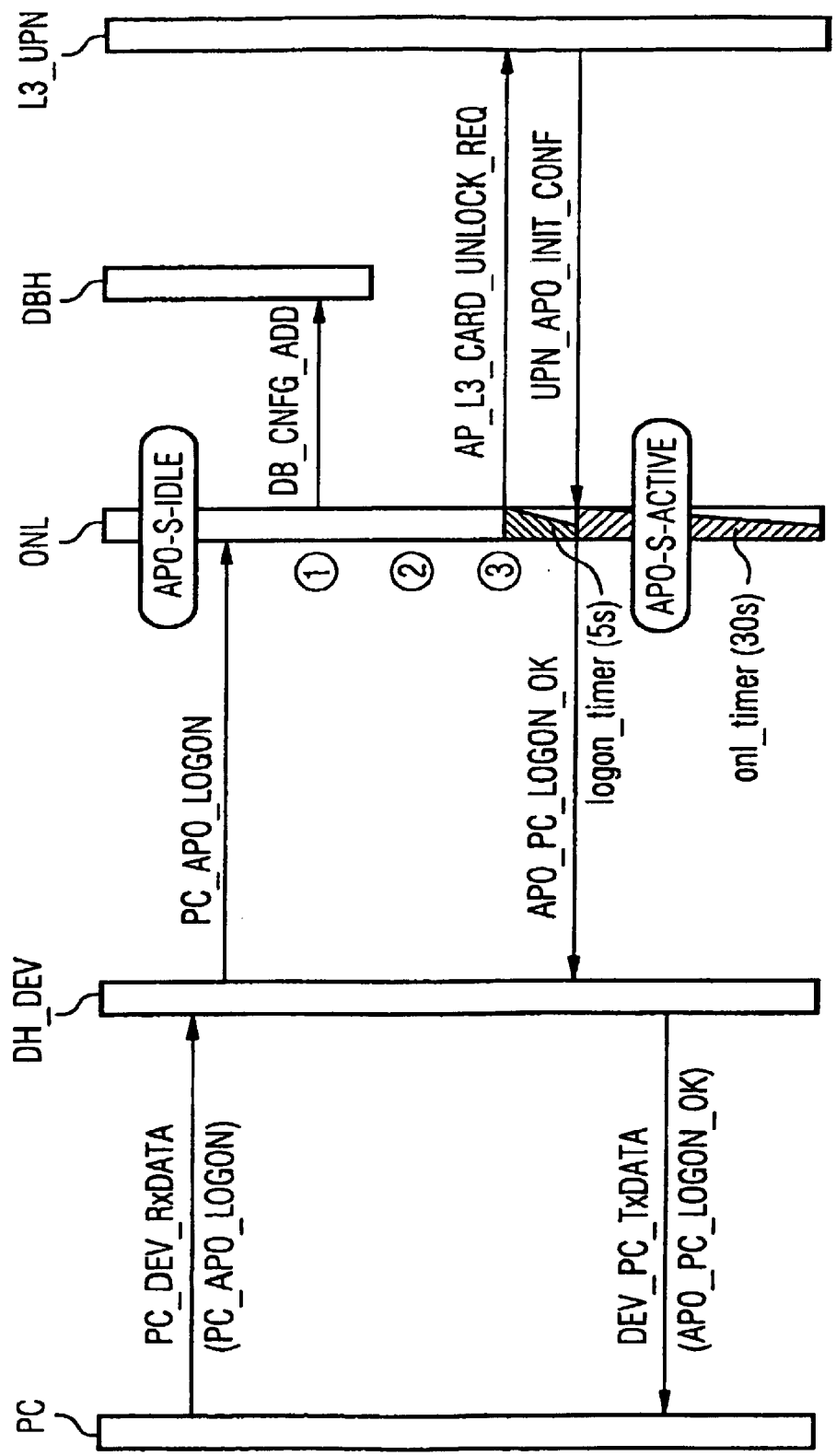
FIG. 2 is a diagrammatic sequence of a LOGON procedure initialized by a remote computer for initializing a remote administration function.

FIG. 2 shows a message sequence, in chronological order, in a LOGON procedure for the remote computer PC inside the modules of the telecommunication system. On starting an "Online" application on the remote computer PC that emulates the terminal, the remote computer PC transmits a message PC_DEV_RxDATA, containing a LOGON inquiry, to the module DH_DEV. The device handler for the devices then transmits a message PC_APO_LOGON to the module ONL, where APO in the message names means the module ONL in the component API. The state of the module ONL is inactive, i.e. an "idle" waiting state, which is indicated by the system variable APO_S_IDLE. On the basis of the LOGON inquiry from the remote computer PC, the module ONL of the system database DBH notifies the existence of a virtual card by the illustrated message DB_CNFG_ADD, since the system cannot communicate with the remote computer PC without any knowledge about the virtual card. After this, the module ONL transmits a request AP_L3_CARD_UNLOCK_REQ to the device handler L3_UPN to enable, i.e. configure, the virtual card (unit) in the virtual slot. The device handler L3_UPN then configures the virtual card and sends back a successful configuration message to the module ONL, using the message UPN_APO_INIT_CONF. When the initialization inquiry from the module ONL was transmitted, a first timer logon_timer was started in the module ONL. Hence, should the successful initialization message fail to appear within a predetermined time, in this case 5 seconds, for example, then the LOGON procedure is terminated. When the successful initialization command is received, the module ONL is switched to the active state, shown in the ONL bar by the system variable APO_S_ACTIVE, and a second timer onl_timer is started which, after a predetermined second time, in this case 30 seconds, for example, interrupts the connection to the remote computer PC again if there is no activity coming from the remote computer PC. The module ONL reports the successful LOGON to the device handler DH_DEV (message APO_PC_LOGON_OK), which in turn transmits a message DEV_PC_TxDATA to the remote computer PC about the successful LOGON procedure. This sets up the connection between the remote computer PC and the telecommunication system for the purpose of remote administration.

Figure 3:
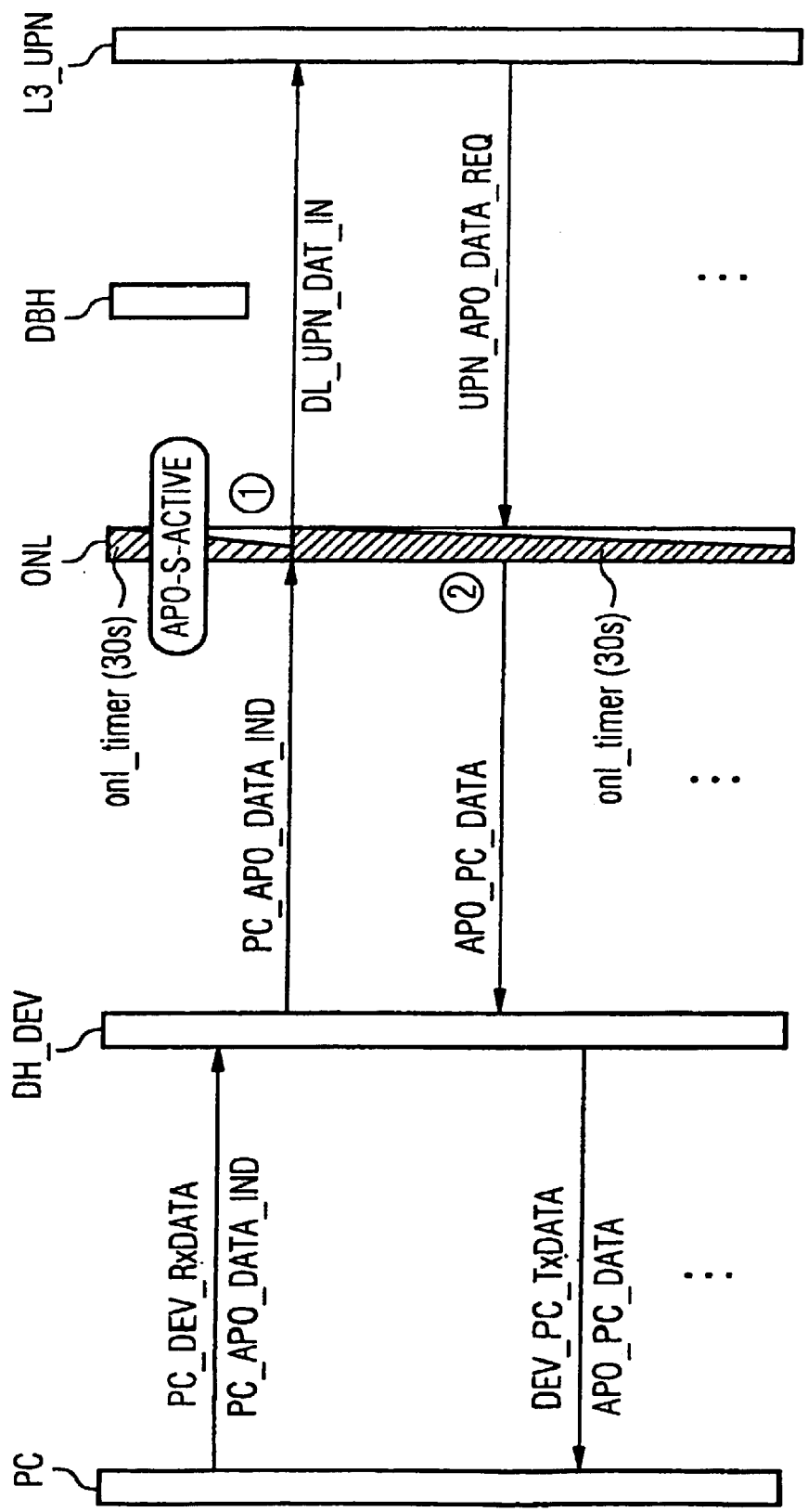
FIG. 3 is a diagrammatic sequence of data transfer between a telecommunications installation and the remote computer during remote administration.

In a similar manner to FIG. 2, FIG. 3 shows the data transfer mode between the remote computer PC and the interface L3_UPN after successful logging on has taken place. It should be noted that logging on the remote computer PC using the procedure shown in FIG. 2 on the remote computer PC emulates an administrative telephone in the remote computer PC. As can be seen from the flow chart shown in FIG. 3, the remote computer PC sends data to the interface L3_UPN and receives data from the latter, the timer onl_timer being reinitialized again each time messages are received from the remote computer PC. Provided that the time condition of the timer onl_timer is fulfilled, the module ONL is in the active state, shown by the system variable APO_S_ACTIVE. In response to the messages from the remote computer PC, the latter receives corresponding messages from the interface L3_UPN, i.e. corresponding menus for the USER module in FIG. 1 which are shown in the emulation of the terminal on the remote computer. The names for the corresponding messages can be seen in FIG. 3.

Figure 4:
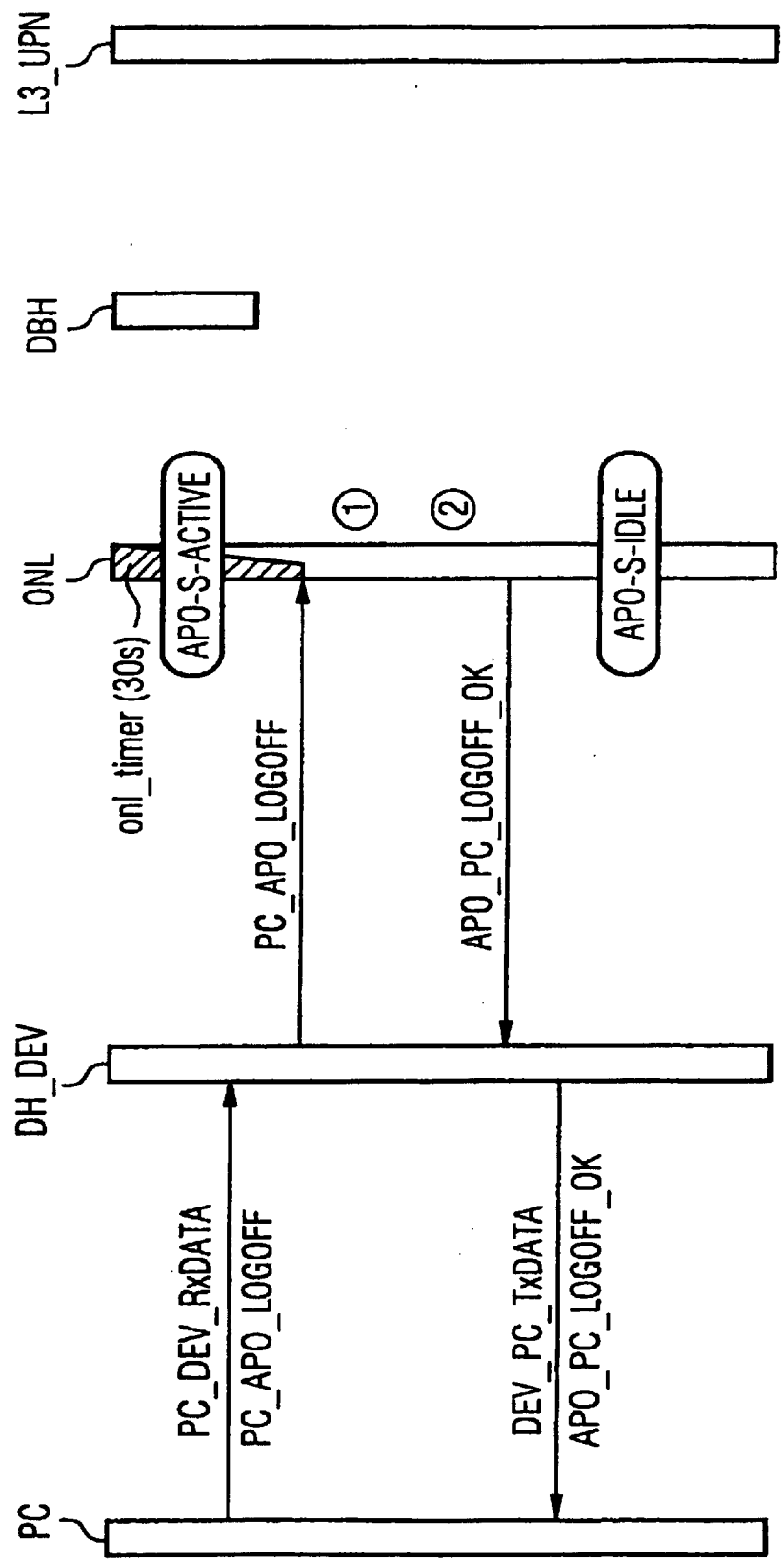
FIG. 4 is a diagrammatic sequence of a LOGOFF procedure initialized by the remote computer for ending the remote administration function.

FIG. 4 shows the remote computer PC being logged off from the telecommunication system. As soon as the "Online" application on the remote computer PC is closed, the remote computer PC sends a LOGOFF message to the telecommunication system, the virtual card is entered as inactive in the database again and pointers and variables are reinitialized. A LOGOFF message is then sent to the device handler DH_DEV and the remote computer PC, and the module ONL changes to the "idle" waiting state again, shown by the system variable APO_S_IDLE. The names of the messages exchanged can be seen in FIG. 4.

Figure 5:
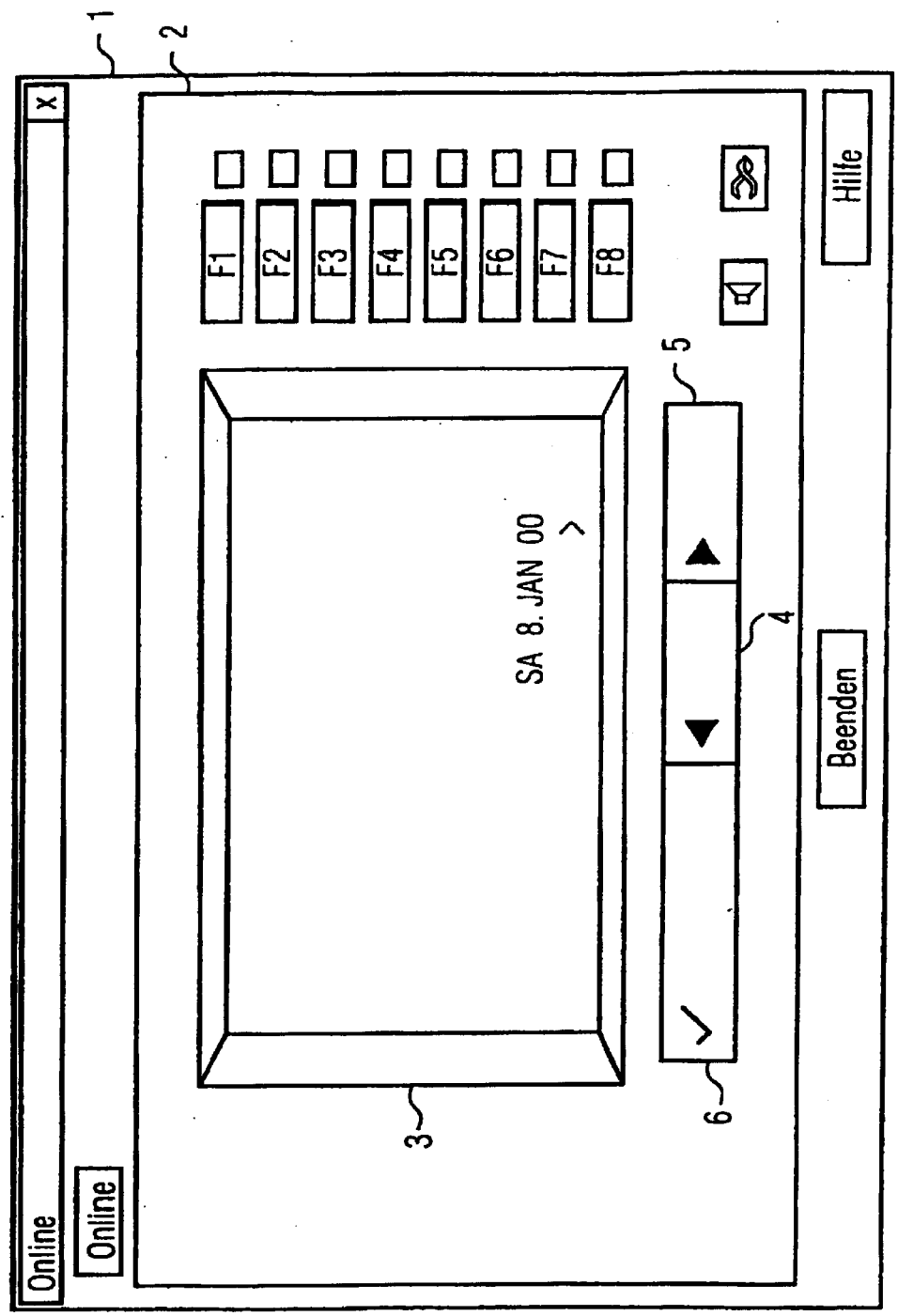
FIG. 5 is a front elevational view of an emulation of a terminal with administration authorization on a remote computer.

FIG. 5 shows the emulated image 2, appearing on the screen 1 of the remote computer PC, of a corresponding telephone with administration authorization, which is created by the "Online" application. The emulated image 2 shows the emulated display 3 of the emulated telephone, its command keys F1 to F8 and cursor keys 4 and 5 for moving a cursor ">" up and down in the display 3. An actuation key 6 for the emulated telephone is also shown. The keys shown and the "Online" Windows keys shown for controlling the Online emulation program, "End" and "Help", can be actuated using the mouse of the remote computer PC, and it is possible to perform the same administration functions as on a real telephone with administration authorization and to manipulate and change the database of the telecommunication system online.

We claim:

1. A telecommunication system used by subscribers and administrated remotely by an administrator, comprising:
a telecommunications apparatus having a virtual terminal with properties of a terminal with administration authorization, said telecommunication apparatus having a device handler and UPN terminals inside of said device handler for virtual ports in a third OSI layer in said telecommunication apparatus to define a virtual port, said telecommunications apparatus having a call processing unit and said device handler for said UPN terminals transmitting and receiving messages to and from said call processing unit; and a remote computer connected to said virtual terminal of said telecommunications apparatus exchanging only administrative changes to the telecommunication system, for remote administration of said telecommunications apparatus.

2. The telecommunication system according to claim 1, wherein said terminal with administration authorization is a telephone.

3. The telecommunication system according to claim 1, wherein said telecommunications apparatus has a virtual port and said virtual terminal is disposed on said virtual port.

4. The telecommunication system according to claim 3, wherein said telecommunications apparatus has a virtual unit and said virtual port is disposed on said virtual unit.

5. The telecommunication system according to claim 4, wherein said telecommunications apparatus has a virtual slot and said virtual unit is disposed in said virtual slot.

6. The telecommunication system according to claim 1, wherein said remote computer has a message interpreter and an emulator providing an interface and functionality of said terminal with administration authorization.

7. The telecommunication system according to claim 1, wherein said telecommunications apparatus has a data interface and control traffic between said virtual port and said telecommunication apparatus is diverted to said data interface.

8. The telecommunication system according to claim 7, wherein said data interface is selected from the group consisting of a V.24 interface, an analog modem and an integrated service digital network card.

9. The telecommunication system according to claim 1, wherein said call processing unit has an application interface with an application module for bidirectional communication with said device handler for said UPN terminals and for controlling an online connection to said remote computer.

10. The telecommunication system according to claim 9, wherein said application module communicates with said device handler for devices and manages external interfaces.

* * * * *